Oct. 5, 1965 A. R. ENGELSCHALL 3,210,479

VOICE-FREQUENCY SELECTIVE SIGNALLING ARRANGEMENT

Filed Aug. 30, 1962 2 Sheets-Sheet 1

INVENTOR.
Albert R. Engelschall

BY
C. A. Gulbrandsen
Atty.

VOICE-FREQUENCY SELECTIVE SIGNALLING ARRANGEMENT

Filed Aug. 30, 1962 2 Sheets-Sheet 2

INVENTOR.
Albert R. Engelschall
BY
C. A. Gulbrandsen
Atty.

United States Patent Office 3,210,479

Patented Oct. 5, 1965

3,210,479
VOICE-FREQUENCY SELECTIVE SIGNALLING ARRANGEMENT

Albert R. Engelschall, Glen Ellyn, Ill., assignor to Automatic Electric Laboratories, Inc., Northlake, Ill., a corporation of Delaware Filed Aug. 30, 1962, Ser. No. 220,401
4 Claims. (Cl. 179—84)

This invention relates to telephone signalling arrangements and in particular to voice-frequency responsive signalling arrangements.

Such a voice-frequency controlled signalling arrangement has been shown, and its advantages pointed out in the patent application Serial Number 213,720, filed by H. C. Talcott on July 31, 1962, and assigned to the same assignee. While the arrangement disclosed in the Talcott application is generally satisfactory in operation there is the possibility that such an arrangement may under certain conditions respond to dial pulses particularly when used on party lines, extension lines and the like.

It is therefore an object of the present invention to provide an improved signalling arrangement.

According to a particular feature of the invention, the signalling arrangement is substantially prevented from responding to dial pulses. This is accomplished in one embodiment by use of a dial pulse limiting circuit and in another embodiment by a dial pulse responsive circuit.

According to another feature of the invention, since the purpose of a signalling arrangement is to attract attenion to an incoming call, circuitry is included to provide the signalling arrangement with a distinct and pleasant audible tone.

Other objects and features will become apparent and the invention will best be understood from the following description and the accompanying drawings in which.

Briefly, the signalling arrangement has a transistor oscillator and a transistor switch powered over the subscriber line by a direct current source in the central office. A voice-frequency signal current is transmitted from the central office over the subscriber line to the signalling arrangement and if the signal current is of the proper voice-frequency, it will enable the transistor switch. The transistor switch then enables the oscillator by switching an operating bias circuit across the input of the oscillator. Operation of the transistor oscillator causes a variable frequency of oscillation in its resonant tank circuit, as will be explained later in greater detail. A sound transducer, being a part of the resonant circuit of the oscillator will emit an audible tone corresponding to the just-mentioned variable frequency.

Figure 1:
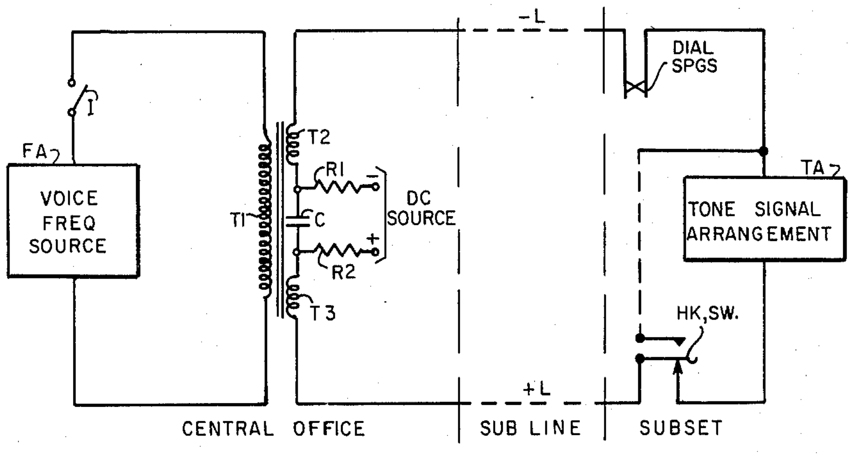
FIG. 1 is a schematic representation of a single frequency signalling system including a signalling arrangement, such as described herein.

Referring to FIG. 1, a single frequency signalling system is shown. The central office has sources of direct current and voice-frequency current FA, a transformer having windings T1, T2, and T3 for coupling the signal currents to the subscriber line, a capacitor C for bypassing the direct current source, and resistances R1, R2. Apparatus for interrupting the signal is represented by the switch I in the central office. The subscriber line connects the central office equipment to a telephone subset having a dial, a hookswitch and a signalling arrangement TA.

Figure 2:
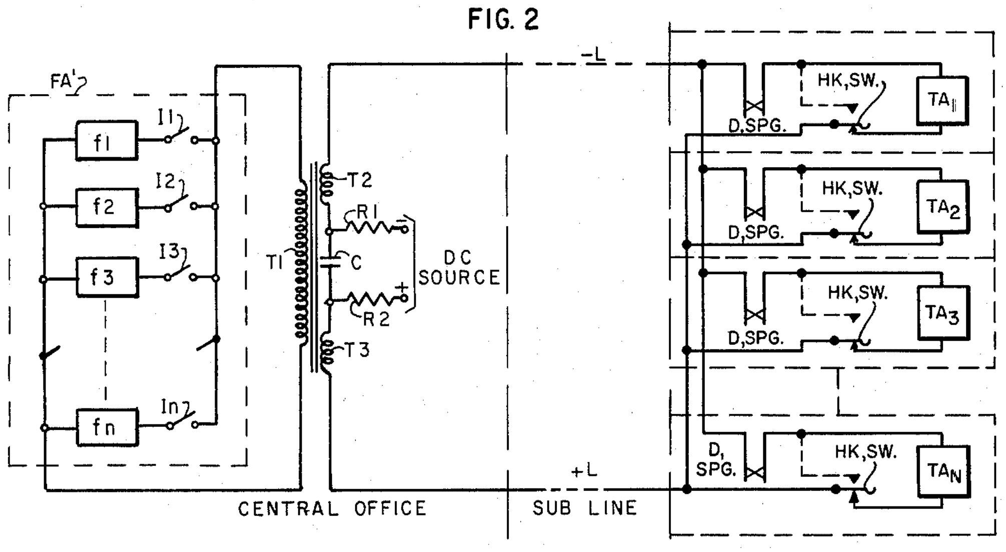
FIG. 2 is a schematic representation of a multi-frequency signalling system including a signalling arrangement, such as described herein.

FIG. 2 shows a multi-frequency system that is similar to FIG. 1 with the exception of a multi-frequency source of voice-frequency signal currents *f*1, *f*2, *f*3, . . . *fn*, at the central office and corresponding signalling arrangements TA1, TA2, TA3, . . . . TA*n* at the subset end of the line. For example, signalling arrangement TA2 should respond to signal current frequency *f*2 only. Apparatus is provided at the central office for interrupting the different frequency signals and is represented by the switches I1, I2, I3, . . . I*n*.

Figure 3:
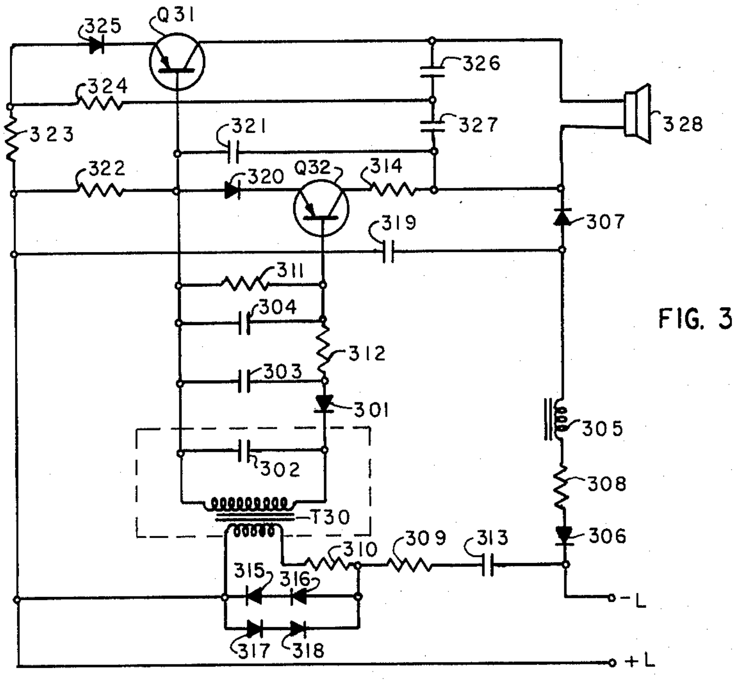
FIG. 3 is a circuit diagram of an embodiment of the invention showing a dial pulse limiting circuit.

Referring now to FIG. 3, a basic Colpitts oscillator, having a transistor Q31 and the resonant circuit and bias circuit is utilized to cause the co-acting sound transducer 328 to emit an audible signal. A transistor Q32 is employed as a "switch" at the input circuit of transistor Q31. Transformer T30, diode 301, capacitors 302–304 and resistances 309–312 furnish a selective input circuit the switching transistor Q32. Also of particular interest are diodes 315–318 which form part of the dial pulse limiting network as will be more fully described below.

Figure 4:
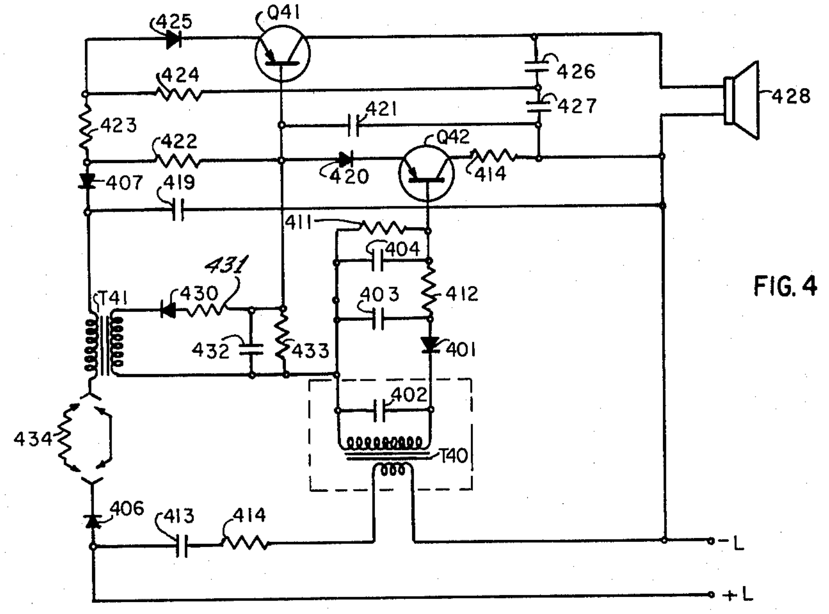
FIG. 4 is a circuit diagram of another embodiment of the invention showing a dial pulse responsive circuit.

Referring to FIG. 4, the signalling arrangement is seen to be similar to that of FIG. 3, therefore, corresponding elements have been given similar identification in the four hundred numbering series. The operation of the arrangement is also similar to that shown in FIG. 3, however, there is now a dial pulse responsive circuit, elements T41 and 430–433, which will be explained later in greater detail.

The signalling systems of FIGS. 1 and 2 are given for illustration only. The arrangement described herein may also advantageously be used in other signalling systems.

As previously stated, the operation of the embodiments in FIGS. 3 and 4 is similar during normal signalling operation. Therefore, only the preferred embodiment shown in FIG. 3, will be explained for the normal signalling operation. Although PNP transistors are shown in FIGS. 3 and 4, it is to be understood that NPN transsistors may also be employed with the corresponding proper polarity changes.

*Normal signalling arrangement response*

Referring again to FIG. 3, when the proper subscriber line is connected to the subscriber line by the central office switching equipment (not shown), direct current is provided over the line, as shown in FIG. 1, to the signalling arrangement at terminals +L and —L and provides direct current power to the emitter and collector electrodes of transistors Q31 and Q32. The transistor Q31 has a positive potential suplied to its emitter electrode by way of the line terminal +L and circuit elements 323 and 325. Negative potential is supplied to the collector electrode of transistor Q31 by way of the line terminal —L and circuit elements 305–308 and 328. Positive potential is supplied to the emitter electrode of transistor Q32 by way of the line terminal +L and circuit elements 322, 320. The collector electrode of transistor Q32 has negative potential supplied by way of line terminal —L and elements 305–308 and 314. Capacitor 313 blocks the central office direct current from the control circuit.

After the subscriber line has been tested for availability, in some well known manner, the central office equipment (not shown) causes voice-frequency signal current to be impressed on the subscriber line, as indicated in FIG. 1. The signal current is to be a sine wave of a specific voice-frequency, say 500 c.p.s. and 2.0 volts R.M.S. at the exchange end of the line. The signal is coupled through the input capacitor 313 to the resistor-diode network 309–310 and 315–318 and the primary winding of transformer T30. The secondary winding of transformer T30, along with the capacitor 302, forms a parallel tuned circuit that is tuned to the input signal frequency (in this case 500 c.p.s.). The signal output of the tuned circuit is half-wave rectified by diode 301 and filtered by the resistor-capacitor filter 303–304 and 311–312. The rectified and filtered signal is applied to the direct current switch, transistor Q32, as a forward emitter-base bias enabling transistor Q32 to conduct.

Conduction of transistor Q32 places the "bleeder circuit" resistor 322, diode 320, transistor Q32 and resistor 314 across the direct current supply circuit. The just-mentioned switch connection provides forward emitter-base bias to the transistor Q31, since its base electrode is connected to the junction between resistor 322 and diode 320. Transistor Q31 conducts and along with the resonant tank circuit 326–328 and feedback resistance 324, generates a frequency of, say 1900 c.p.s., causing the sound transducer to emit an audible signal. The audible signal will be interrupted at a rate controlled at the central office.

The input circuit to transistor Q32 and its collector electrode circuit including elements 305–308 and 314 form an alternating current time delay circuit effecting a frequency change of the oscillator and consequently the pitch of the audible output signal. For example, if the rate of interruption is 12 times per second and the time delay is one-twentieth of a second, the delay in switching causes a noticeable rise in the output frequency from one lower than prescribed say 1600 c.p.s. to that of the design frequency (1900 c.p.s.) during this time delay in switching. This action gives the effect of two or more frequencies in the output signal which is most pleasing to the ear.

Diode 320, connected in series with the emitter electrode of transistor Q32 has a three-fold purpose. First, it provides a reverse bias and thereby reduces the emitter-collector leakage current in transistor Q32. The use of this diode permits a relatively high resistance (311) to be used between the emitter and base, while still maintaining an acceptable degree of temperature stability. The diode also improves the selectivity of the tuned input circuit by establishing a threshold and discouraging signals below the threshold level.

*Dial pulse response*

Still referring to FIG. 3, when dial pulses are impressed on the subscriber line a dial pulse suppression circuit is utilized to prevent response of the signalling arrangement. Dial pulses could be impressed on the subscriber line by the particular subscribers subset, an extension subset or the subset of another party in a party line arrangement. One part of this suppression circuit is the diode arrangement 315–318 which limits dial pulses by a "clipping" action. The clipping action and a time delay circuit including elements 305, 308 and 319 effectively prevents the signalling arrangement from responding to dial pulses. The clipping and time delay also helps to prevent undesirable response to spurious line noises.

It should be pointed out that in this design the diode clipping arrangement is not used to control or limit the incoming signal, as is done in certain other designs. The triggered oscillator arangement has the advantage of inherent limiting action, such that an increase in input signal, beyond that required to saturate the transistor switch, produces essentially no change in the sound output or the direct line current.

The combination of elements 305, 308 and 319 serve a three-fold purpose. Inductor 305 and capacitance 319 constitute a filter which prevents the output signal of the oscillator from feeding back into the line or signalling arrangement input circuit. The series impedance of inductor 305 isolates the oscillator circuit from the line at voice-frequencies, and thus helps to maintain a fairly high alternating current input impedance. As previously noted, the time delay of elements 305, 308 and 319 helps suppress dial pulse response.

Referring again to FIG. 4, when dial pulses are impressed on the subscriber line a dial pulse responsive circuit is employed to prevent operation of the signalling arrangement by employing a negative voltage feedback. In this circuit, if dial pulses are impressed on the line, a current of rather high amplitude pulses flows through the line (primary) winding of transformer T41, especially if the capacitor 419 is fairly large. During normal signalling however, the alternating current component through the primary winding of the transformer T41, is much lower in magnitude. The circuit exploits this difference by employing a suitable secondary winding in the transformer in which a voltage is induced that is proportional to the alternating current component of current in the line winding. The voltage is rectified by diode 430, filtered by resistance 431 and capacitance 432, and applied to resistance 433. This direct current voltage is then applied as a reverse or "inhibiting" bias to the emitter-base circuit of the transistor switch Q42, the negative fedback being in series opposition to the forward control bias derived from the tuned input circuit.

As just stated, during a time that dial pulses are present, the reverse bias subtracts from the forward control bias by an amount sufficient to prevent oscillator operation. During signalling however, the reverse bias that is derived by way of the dial pulse responsive circuit is not sufficient to seriously reduce the forward bias of transistor Q42. By careful choice of circuit constants, the silicon diode 430 can be made to assist in differentiating between the two signals by taking advantage of the rather sharp "knee" in its forward conduction characteristic.

During normal operation, the line finding of transformer T41, as modified by the reflected secondary load, constitutes a series impedance which serves to isolate the oscillator circuit from the input circuit at voice-frequencies.

If the capacity of 419 must be limited by practical considerations to, say 2 mf. or so, the circuit operation can be improved by inserting the additional resistance 434 in series with the line winding of transformer T41 and eliminating the resistance 431 following the feedback diode 430. However, if the direct line current and input signal requirements are to be the same, resistance 423 must be reduced. Resistance 434 will also help inhibit the dial pulse response by increasing the direct current time delay associated with transformer T41 and capacitor 419.

The arrangements shown in both FIGS. 3 and 4 employ a Zener diode (307, 407) for "talk-off" protection since the arrangements described are responsive to voice-frequencies at ordinary speech levels. In a particular design, during signalling the Zener diode "conducts" and effectively subtracts 24 volts from the direct current voltage existing at the input terminals +L, −L of the arrangement. In this design, when any one of the telephones is "off-hook," the direct current voltage across all such arrangements on the same line drop to 24 volts or less. Under this condition the diode ceases to conduct and thereby prevents operation of the signalling arrangement.

Also in each circuit is a diode (306, 406) that protects the circuitry from reverse direct current potentials. The use of a single diode in this manner requires that the arrangement be properly polarized with respect to the line potential.

The invention presented herein has been described in certain embodiments, and by way of illustration using certain circuit values. Modifications can be made by one skilled in the art without departing from the spirit and scope of the invention and should be included in the appended claims.

What is claimed is:

1. In a telephone system, a subscriber line, a subset including a signalling arrangement connected to said line, means for connecting a source of alternating current to said line for operating said arrangement, first transformer means coupling said line to said signalling arrangement permitting said alternating current and also permitting transients occurring due to dial pulses on said line to be passed to said signalling arrangement and second transformer means coupling said line to said signalling arrangement providing minimum coupling for said alternating current and providing coupling for dial pulse produced transients in a sense opposite to that provided by said first transformer means, whereby said second transformer means substantially compensates for dial pulse transients passed by said first transformer means.

2. In a telephone system, as claimed in claim 1, wherein said two transformer means each have a primary section and a secondary section, and wherein the primary sections of both said transformer means are electrically coupled to said subscriber line.

3. In a telephone system, as claimed in claim 2, wherein said signalling arrangement includes a tone generator and switching means controlling the operation of said tone generator, said switching means including a transistor having a base-emitter circuit and wherein the secondary section of said first transformer means provides an operating bias to said base-emitter circuit and said secondary section of said second transformer means provides an inhibiting bias to said base-emitter circuit.

4. In a telephone system including a central office having a source of direct current and a source of voice-frequency ringing currents interrupted so as to occur as pulses, a subscriber line, and a signalling arrangement powered over said line by said direct current for generating an audible tone of a varying frequency, said arrangement comprising: an oscillator circuit designed to operate at a specified frequency, and switching means controlling the operation of said oscillator, said switching means having an input circuit coupled to said subscriber line, said input circuit including alternating current time delay means having a delay time shorter than but of a magnitude appreciable compared with the time width of each of said signal current pulses, said time delay means effecting the operation of said oscillator whereby its output rises from a first frequency to said specified frequency during said time delay.

References Cited by the Examiner

UNITED STATES PATENTS

| | | | |
|---|---|---|---|
| 2,824,173 | 2/58 | Meacham | 179—81 |
| 2,824,175 | 2/58 | Meacham | 179—86 |
| 3,005,053 | 10/61 | Schmidt | 179—17 |
| 3,075,048 | 1/63 | Boeryd | 179—84 |
| 3,091,666 | 5/63 | Meacham | 179—17 |

ROBERT H. ROSE, *Primary Examiner.*

WALTER L. LYNDE, *Examiner.*